United States Patent
Childs et al.

(10) Patent No.: US 7,574,621 B2
(45) Date of Patent: Aug. 11, 2009

(54) METHOD AND SYSTEM FOR IDENTIFYING AND RECOVERING A FILE DAMAGED BY A HARD DRIVE FAILURE

(75) Inventors: Philip Lee Childs, Raleigh, NC (US); Jeffrey R. Hobbet, Holly Springs, NC (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 459 days.

(21) Appl. No.: 11/375,640

(22) Filed: Mar. 14, 2006

(65) Prior Publication Data

US 2007/0220306 A1    Sep. 20, 2007

(51) Int. Cl.
*G06F 11/00* (2006.01)
(52) U.S. Cl. .......................................................... 714/6
(58) Field of Classification Search ................. 714/6, 714/2–5, 7, 8, 13–15, 20
See application file for complete search history.

(56) References Cited

U.S. PATENT DOCUMENTS

| | | | |
|---|---|---|---|
| 6,199,178 B1 * | 3/2001 | Schneider et al. | 714/21 |
| 6,247,152 B1 * | 6/2001 | Russell | 714/718 |
| 6,427,215 B2 * | 7/2002 | Rafanello et al. | 714/710 |
| 6,732,293 B1 * | 5/2004 | Schneider | 714/15 |
| 7,260,590 B1 * | 8/2007 | Williams | 707/204 |
| 2007/0100905 A1 * | 5/2007 | Masters et al. | 707/201 |

* cited by examiner

*Primary Examiner*—Nadeem Iqbal
(74) *Attorney, Agent, or Firm*—Sawyer Law Group P.C.; Carlos Munoz-Bustamante

(57) ABSTRACT

A method and system for identifying and recovering a file damaged by a hard drive failure. The method includes monitoring event logs, mapping at least one failing sector to at least one corresponding corrupted file if a hard drive failure is detected, and performing a selected remedial procedure based on the at least one corrupted file. According to the method and system disclosed herein, the user is quickly informed of the corrupted file and is given choices for remedial procedures.

28 Claims, 3 Drawing Sheets

100

METHOD AND SYSTEM FOR IDENTIFYING AND RECOVERING A FILE DAMAGED BY A HARD DRIVE FAILURE

FIELD OF THE INVENTION

The present invention relates to computer systems, and more particularly to a method and system for identifying and recovering a file damaged by a hard drive failure.

BACKGROUND OF THE INVENTION

Hard disk drives are well known. One problem with hard disk drives is that their failures can cause data corruption, which results in damaged/corrupted files. A corrupted file may result in the loss of valuable information. A disk drive failure may also result in the inability to boot a computer. Hard drive failures often can go undetected for long periods of time (e.g., until a corrupted file resulting from the hard drive failure is noticed).

One conventional solution is to use backup or restore programs, which can restore corrupted files or restore the entire hard drive. However, these approaches suffer from one or more of the following problems: First, the backup may be too old where the corrupted file does not exist in the backup or may be too back level to be of use. Furthermore, the restore itself may result in loss of other data. As a result, the user would not be aware of which files are corrupted and when the corrupted files became corrupted. Furthermore, the backup may not capture the corrupted file, which may happen if the corrupted file was excluded or locked when the backup was performed. Furthermore, if the hard disk failure is such that the user cannot boot the computer, the user might not be able to restore the corrected file.

Accordingly, what is needed is an improved method and system for identifying and recovering a file damaged by a hard drive failure. The present invention addresses such a need.

SUMMARY OF THE INVENTION

A method and system for identifying and recovering a file damaged by a hard drive failure is disclosed. The method includes monitoring event logs, mapping at least one failing sector to at least one corresponding corrupted file if a hard drive failure is detected, and performing a selected remedial procedure based on the at least one corrupted file. According to the method and system disclosed herein, the user is quickly informed of the corrupted file and is given choices for remedial procedures.

DETAILED DESCRIPTION OF THE INVENTION

The present invention relates to computer systems, and more particularly to a method and system for identifying and recovering a file damaged by a hard drive failure. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention for identifying and recovering a file damaged by a hard drive failure is disclosed. The method includes monitoring event logs and detecting when a hard drive failure has occurred. When a hard drive failure is detected, the method further includes mapping the failing sectors to corresponding corrupted files, informing the user of the corrupted files, and providing a selection of one or more remedial procedures to the user and performing a remedial procedure based on the selection. As a result, the user is quickly informed of the corrupted file and is given choices for remedial procedures.

Although the present invention disclosed herein is described in the context of identifying and recovering a file damaged by a hard drive failure, the present invention may apply to other types of memory failures, and still remain within the spirit and scope of the present invention.

Figure 1:
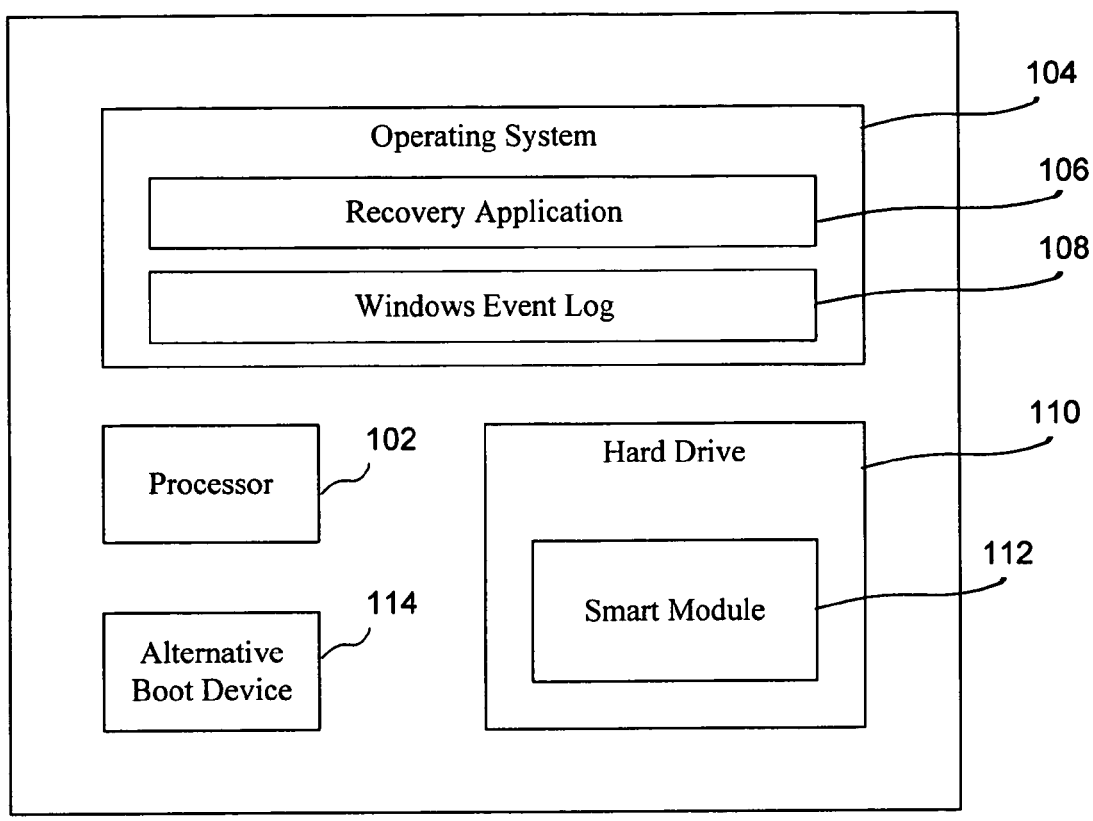
FIG. 1 is a block diagram of a system that identifies and recovers files damaged by a hard drive failure in accordance with the present invention.

FIG. 1 is a block diagram of a system 100 that identifies and recovers files damaged by a hard drive failure in accordance with the present invention. The system 100 includes a processor 102, an operating system 104 having a recovery application 106, a Windows event log 108, a hard drive 110 having a self-monitoring analysis and reporting technology (SMART) module 112, an alternative boot device 114. Although the present invention disclosed herein is described in the context of a Windows event log and a SMART module, the present invention may apply to other types of analysis and reporting technologies, and still remain within the spirit and scope of the present invention. In one implementation, the recovery application 106 may be located in the system 100 as shown in FIG. 1. Alternatively, the recovery application 106 may be located elsewhere (e.g., in a system memory, on the hard drive 110, or on another hard drive).

In operation, the Windows event log 108 monitors and records failed read attempts on the hard drive 110. In one embodiment, the Windows event log 108 generates and stores hard drive failure logs in the operating system 104. Alternatively, the hard drive failure logs may be stored in other locations such as in the hard drive 110. The SMART module 110 monitors the sectors of the hard drive 110 and identifies specific failing sectors on the hard drive 110. In one embodiment, the SMART module 110 generates sector failure logs and stores the sector failure logs in on the hard drive 110. Alternatively, the sector failure logs may be stored in other locations such as in the operating system 104. In one embodiment, the hard drive failure logs and sector failure logs may be retrieved through commands such as Integrated Device Electronics (IDE) commands.

Figure 2:
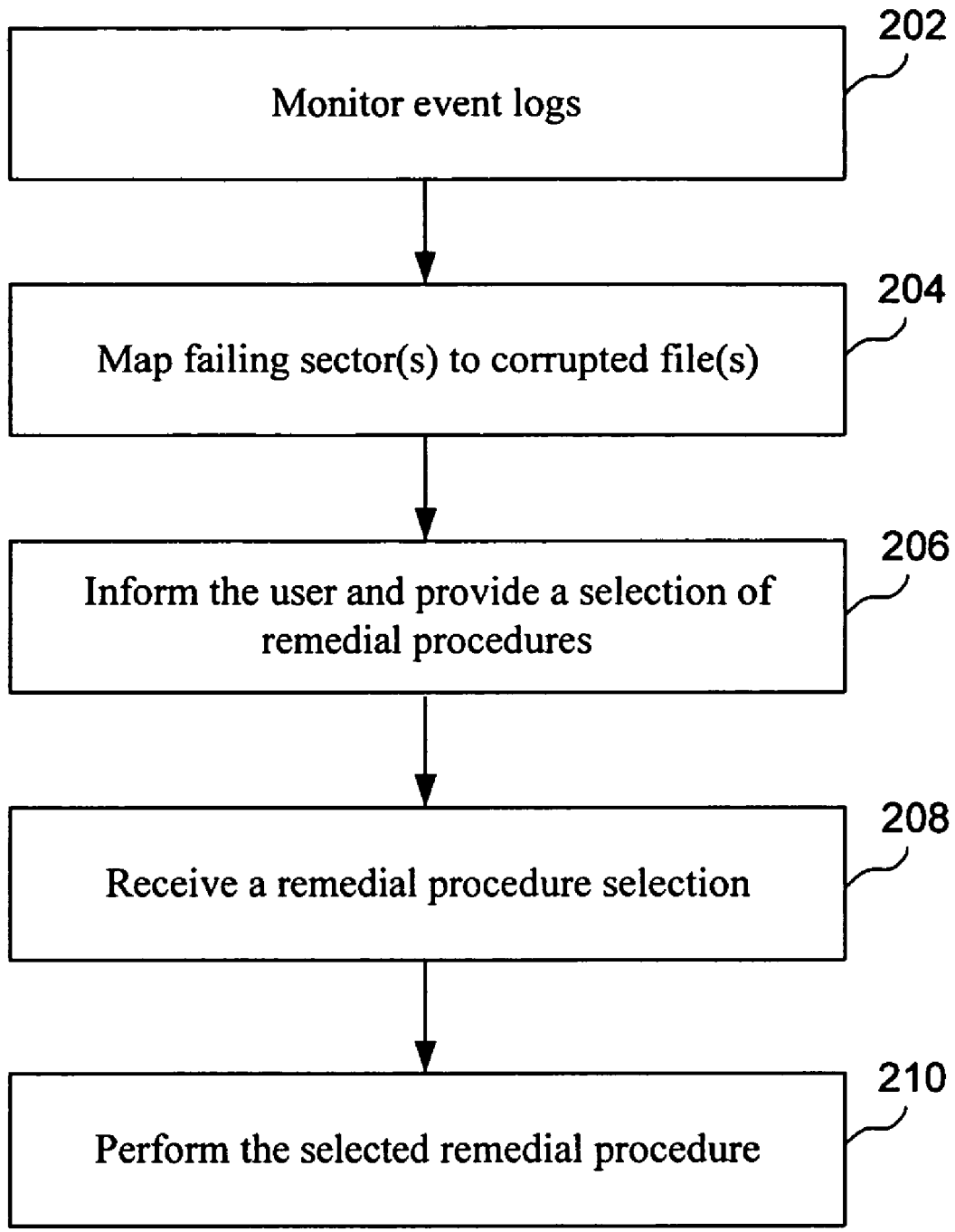
FIG. 2 is a flow chart showing a method for identifying and recovering a file damaged by a hard drive failure in accordance with the present invention.

FIG. 2 is a flow chart showing a method for identifying and recovering a file damaged by a hard drive failure in accordance with the present invention. The process begins in a step 202 where the recovery application 106 monitors event logs. Next, in a step 204, if the recovery application 106 detects a failure on the hard drive, the recovery application 106 maps the failing sector(s) to the corresponding corrupted file(s). Next, in a step 206, the recovery application 106 informs the user that one or more files have been corrupted, and for each corrupted file, provides a selection of remedial procedures to the user. As described in more detail below, in one embodiment, the remedial procedures may include: restoring the corrupted file(s) from backup; resetting the failing sector(s); and restoring the failing sector(s). In one embodiment, if the computer cannot boot, these choices are provided by the alternative boot device 114 or other suitable rescue and recovery environment (e.g., a Hypervisor environment, such as DearValley). In one implementation, the alternative boot device 114 may be located in the system 100 as shown in FIG. 1. Alternatively, the alternative boot device 114 may be located externally (e.g., on a compact disk, on another hard drive, on a pre-boot execution environment (PXE)). Next, in a step 208, the recovery application 106 receives a remedial procedure selection from the user. Next, in a step 210, the recovery application 106 performs the selected remedial procedure.

Figure 3:
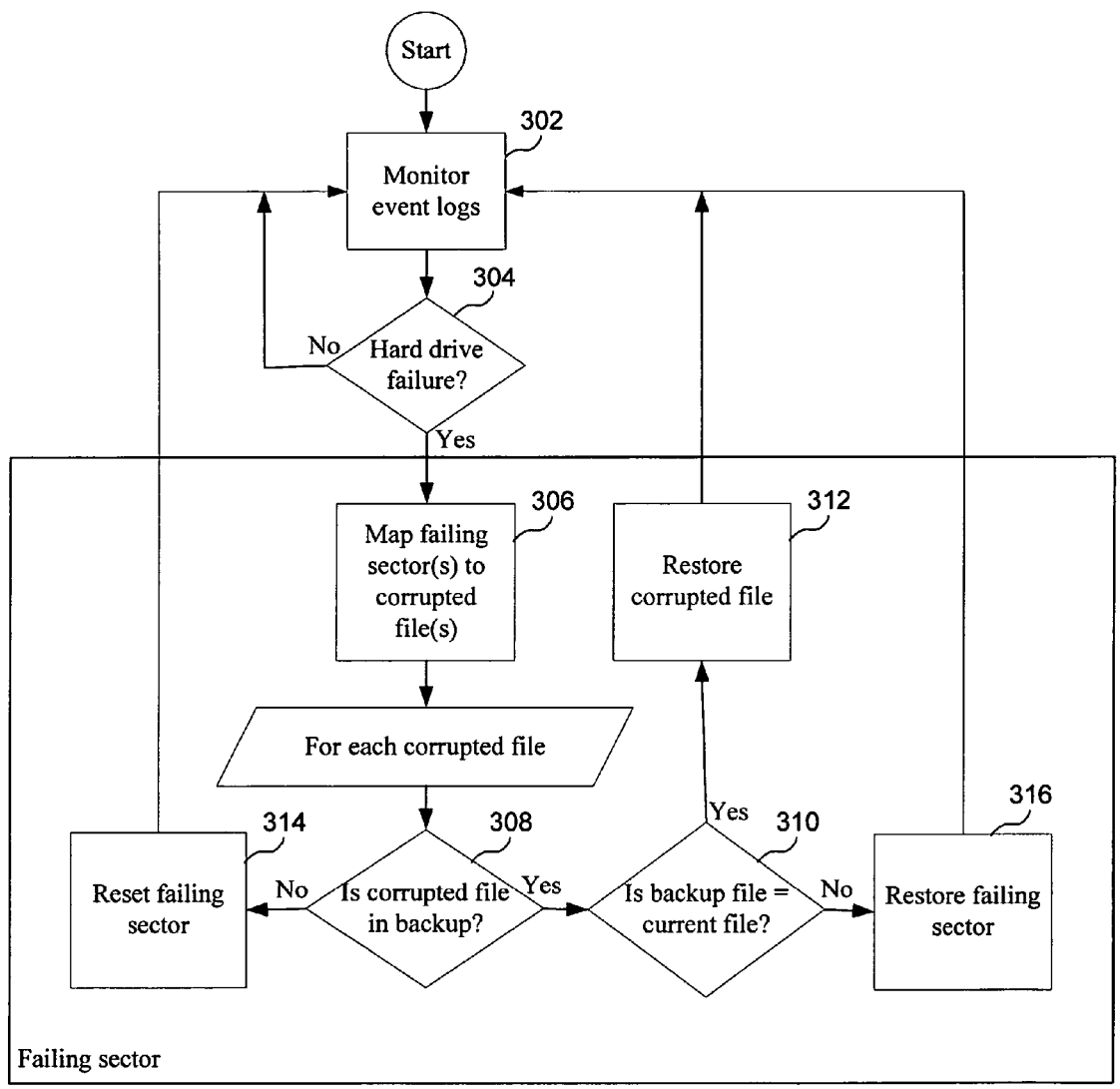
FIG. 3 is a flow chart showing a method for identifying and recovering a file damaged by a hard drive failure in accordance with another embodiment of the present invention.

FIG. 3 is a flow chart showing a method for identifying and recovering a file damaged by a hard drive failure in accordance with another embodiment of the present invention. The process begins in a step 302 where the recovery application 106 monitors event logs. In one implementation, the SMART module 112 and/or the Windows event log 108 generates the event logs. Although the present invention disclosed herein is described in the context of failure logs generated by the SMART module 112 or the Windows event log 108, the present invention may apply to other modules that generate event logs, and still remain within the spirit and scope of the present invention.

Next, in a step 304, the recovery application 106 determines whether a hard drive failure has occurred. If the recovery application 106 does not detect any hard drive failures, the recovery application 106 continues to monitor the event logs. If the recovery application 106 detects a hard drive failure, in a step 306, the recovery application maps the failing sector(s) to the affected (i.e., corrupted) file(s). Next, in a step 308, for each corrupted file, the recovery application 106 determines whether a backup version of the corrupted file exists.

If a backup version of a corrupted file exists, in a step 310, the recovery application 106 determines if the backup version is the same version as the corrupted file (i.e., the current version of the corrupted file has not been changed since it was backed up). If the backup file is the same version as the corrupted file, in a step 312, the recovery application 106 restores the corrupted file by replacing the corrupted file with the backup file and then continues to monitor the event logs. In one embodiment, before the recovery application performs this remedial procedure, the recovery application 106 first informs the user that the file has been corrupted and then provides the user with a selection. In one implementation, the selection may be whether to restore the corrupted file with the backup version.

Next, if a backup version of the corrupted file does not exist, in a step 314, the recovery application 106 resets the failing sector(s) corresponding to the corrupted file and then continues to monitor the event logs. Resetting the failing sectors involves causing Windows to provide the uncorrupted contents of the corrupted file by writing data to the failing sector. As such, the contents of the file may or may not be intact. Even if some of the contents were not intact, the user would at least have intact portions of the contents from which to work. Furthermore, the corrupted file may have redundant information. Accordingly, if some content becomes unreadable, it is possible that copies of the same content may be readable. In one embodiment, before the recovery application performs this remedial procedure, the recovery application 106 first informs the user that the file has been corrupted and then provides the user with a selection. In one implementation, the selection may be whether the user wants to reset the failing sector(s). In another implementation, the selection may be whether to reset the failing sector(s) or to restore the failing sector(s) as described below.

If the backup file is not the same version as the current file, in a step 316, the recovery application 106 restores the failing sector corresponding to the corrupted file and then continues to monitor the event logs. Restoring the failing sector(s) involves attempting to repair as much of the corrupted file as possible. In one implementation, if more than one backup version exists, the recovery application 106 selects the latest version of the backup file. Since a portion of the backup file may still be valid (i.e., up-to-date), the recovery application 106 repairs the corrupted file by replacing a failing sector with a sector of the backup file, wherein the sector of the backup file has the same offset as the failing sector. In one implementation, this process is repeated for each failing sector. As a result, the resulting repaired file contains the uncorrupted sectors of the previously corrupted file (which contain up-to-date content) and contains sectors from the backup file (which contain at least the most-recently-updated backup content) in place of the failing/corrupted sectors. As described above, in one embodiment, before the recovery application 106 would perform this remedial procedure, the recovery application 106 first informs the user that the file has been corrupted and then provides the user with a selection. In one implementation, the selection may be whether to reset the failing sector (s). In another implementation, the selection may be whether to reset the failing sector(s) or to restore the failing sector(s) (described below). In one embodiment, the recovery application 106 automatically performs one of the above-described remedial procedures, depending on which remedial procedure is available.

According to the method and system disclosed herein, the present invention provides numerous benefits. For example, embodiments of the present invention notify the user of data corruption much sooner than conventional methods and systems. Embodiments of the present invention also allow only the corrupted files to be repaired if desired. Embodiments of the present invention also provide an option to repair only the failing sectors. Embodiments of the present invention also enable repairs even if the computer cannot boot to Windows from the hard drive.

A method and system for identifying and recovering a file damaged by a hard drive failure has been disclosed. The method includes monitoring event logs and detecting when a hard drive failure has occurred. When a hard drive failure is detected, the method further includes mapping the failing sectors to corresponding corrupted files, informing the user of the corrupted files, and providing a selection of one or more remedial procedures to the user and performing a remedial procedure based on the selection. As a result, the user is quickly informed of the corrupted file and is given choices for remedial procedures.

The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A method for identifying and recovering a file damaged by a hard drive failure, the method comprising:
monitoring event logs;
mapping at least one failing sector to at least one corresponding corrupted file if a hard drive failure is detected;
for each corrupted file, providing a selection of remedial procedures to a user;
receiving a selected remedial procedure from the user; and
performing a selected remedial procedure based on the at least one corrupted file, wherein the selection comprises:
restoring at least one corrupted file from a backup file;
resetting at least one failing sector corresponding to the corrupted file; and
restoring at least one failing sector corresponding to the corrupted file.

2. The method of claim 1 further comprising determining whether a backup version of the corrupted file exists.

3. The method of claim 1 further comprising determining whether the backup version is the same version as the corrupted file if a backup version of the corrupted file exists.

4. The method of claim 1 further comprising restoring the corrupted file by replacing the corrupted file with the backup file if the backup file is the same version as the corrupted file.

5. The method of claim 1 further comprising restoring at least one failing sector corresponding to the corrupted file if the backup file is not the same version as the corrupted file.

6. The method of claim 1 wherein the restoring comprises replacing at least one failing sector with at least one sector of the backup file, and wherein the at least one sector of the backup file has the same offset as the at least one failing sector.

7. The method of claim 1 further comprising resetting at least one failing sector corresponding to the corrupted file if a backup version of the corrupted file does not exist.

8. The method of claim 1 wherein the resetting comprises providing the uncorrupted contents of the corrupted file by writing data to the failing sector.

9. The method of claim 1 wherein at least one of a SMART module and a Windows event log generates the event logs.

10. A computer-readable storage medium containing program instructions for identifying and recovering a file damaged by a hard drive failure, the program instructions which when executed by a computer system cause the computer system to execute a method comprising:
monitoring event logs;
mapping at least one failing sector to at least one corresponding corrupted file if a hard drive failure is detected;
for each corrupted file, providing a selection of remedial procedures to a user; and
receiving a selected remedial procedure from the user; and
performing a selected remedial procedure based on the at least one corrupted file, wherein the selection comprises:
restoring at least one corrupted file from a backup file;
resetting at least one failing sector corresponding to the corrupted file; and
restoring at least one failing sector corresponding to the corrupted file.

11. The computer-readable storage medium of claim 10 further comprising program instructions for determining whether if a backup version of the corrupted file exists.

12. The computer-readable storage medium of claim 10 further comprising program instructions for determining whether the backup version is the same version as the corrupted file if a backup version of the corrupted file exists.

13. The computer-readable storage medium of claim 10 further comprising program instructions for restoring the corrupted file by replacing the corrupted file with the backup file if the backup file is the same version as the corrupted file.

14. The computer-readable storage medium of claim 10 further comprising program instructions for restoring at least one failing sector corresponding to the corrupted file if the backup file is not the same version as the corrupted file.

15. The computer-readable storage medium of claim 10 wherein the restoring comprises program instructions for replacing at least one failing sector with at least one sector of the backup file, and wherein the at least one sector of the backup file has the same offset as the at least one failing sector.

16. The computer-readable storage medium of claim 10 further comprising program instructions for resetting at least one failing sector corresponding to the corrupted file if a backup version of the corrupted file does not exist.

17. The computer-readable storage medium of claim 10 wherein the resetting comprises program instructions for providing the uncorrupted contents of the corrupted file by writing data to the failing sector.

18. The computer-readable storage medium of claim 10 wherein at least one of a SMART module and a Windows event log generates the event logs.

19. A system for identifying and recovering a file damaged by a hard drive failure, the system comprising:
a processor;
an operating system operatively coupled to the processor; and
a recovery application operatively coupled to the operating system, wherein the recovery application comprises program instructions for:
monitoring event logs;
mapping at least one failing sector to at least one corresponding corrupted file if a hard drive failure is detected;
for each corrupted file, providing a selection of remedial procedures to a user;
receiving a selected remedial procedure from the user; and
performing a selected remedial procedure based on the at least one corrupted file, wherein the selection comprises:
restoring at least one corrupted file from a backup file;
resetting at least one failing sector corresponding to the corrupted file; and
restoring at least one failing sector corresponding to the corrupted file.

20. The system of claim 19 wherein the recovery application further comprises program instructions for determining whether a backup version of the corrupted file exists.

21. The system of claim 19 wherein the recovery application further comprises program instructions for determining whether the backup version is the same version as the corrupted file if a backup version of the corrupted file exists.

22. The system of claim 19 wherein the recovery application further comprises program instructions for restoring the corrupted file by replacing the corrupted file with the backup file if the backup file is the same version as the corrupted file.

23. The system of claim 19 wherein the recovery application further comprises program instructions for restoring at least one failing sector corresponding to the corrupted file if the backup file is not the same version as the corrupted file.

24. The system of claim 19 wherein the restoring comprises replacing at least one failing sector with at least one sector of the backup file, and wherein the at least one sector of the backup file has the same offset as the at least one failing sector.

25. The system of claim 19 wherein the recovery application further comprises program instructions for resetting at least one failing sector corresponding to the corrupted file if a backup version of the corrupted file does not exist.

26. The system of claim 19 wherein the resetting comprises providing the uncorrupted contents of the corrupted file by writing data to the failing sector.

27. The system of claim 19 wherein at least one of a SMART module and a Windows event log generates the event logs.

28. A method for identifying and recovering a file damaged by a hard drive failure, the method comprising:
   monitoring event logs;
   mapping at least one failing sector to at least one corresponding corrupted file if a hard drive failure is detected; and
   performing a selected remedial procedure based on the at least one corrupted file, wherein the selected remedial procedure comprises one of:
     restoring at least one corrupted file from a backup file;
     resetting at least one failing sector corresponding to the corrupted file; and
     restoring at least one failing sector corresponding to the corrupted file.

* * * * *

UNITED STATES PATENT AND TRADEMARK OFFICE
CERTIFICATE OF CORRECTION

PATENT NO. : 7,574,621 B2
APPLICATION NO. : 11/375640
DATED : August 11, 2009
INVENTOR(S) : Childs et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 609 days.

Signed and Sealed this

Seventh Day of September, 2010

David J. Kappos
*Director of the United States Patent and Trademark Office*